Nov. 5, 1968  J. F. CHUMLEY ET AL  3,408,870
ZERO GRAVITY APPARATUS
Filed May 9, 1966  2 Sheets-Sheet 1
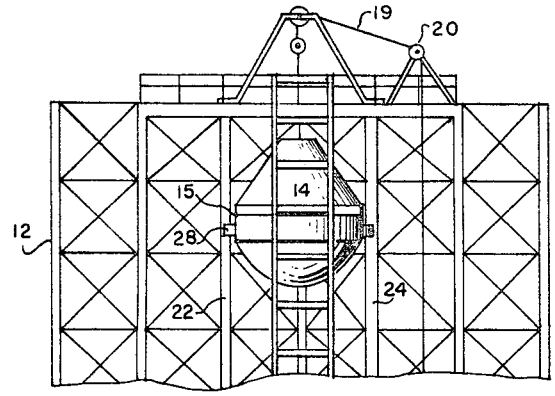
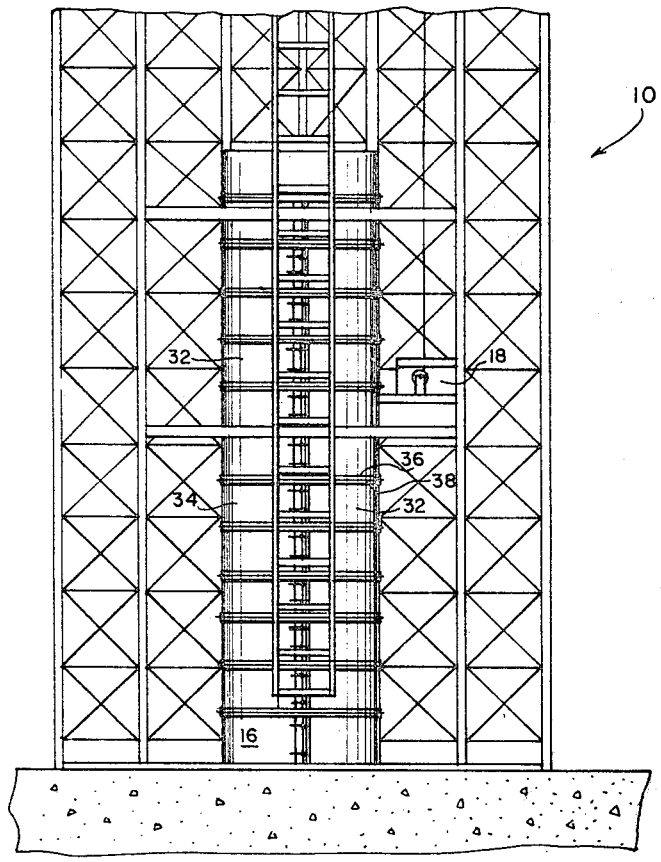
FIG. 1
JAMES F. CHUMLEY,
GUY D. PERRY,
INVENTORS.
BY
ATTORNEYS

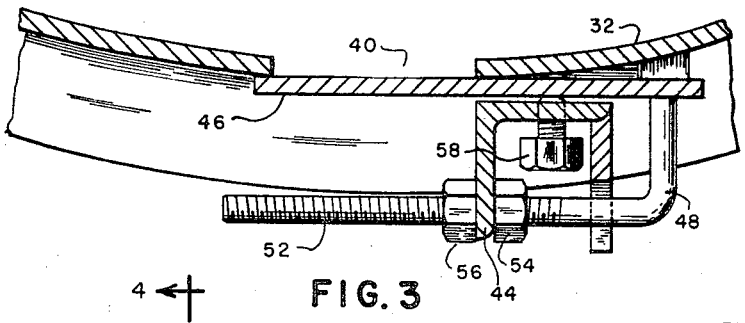
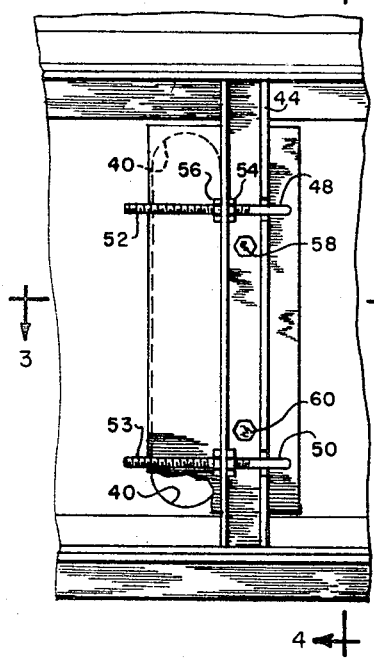
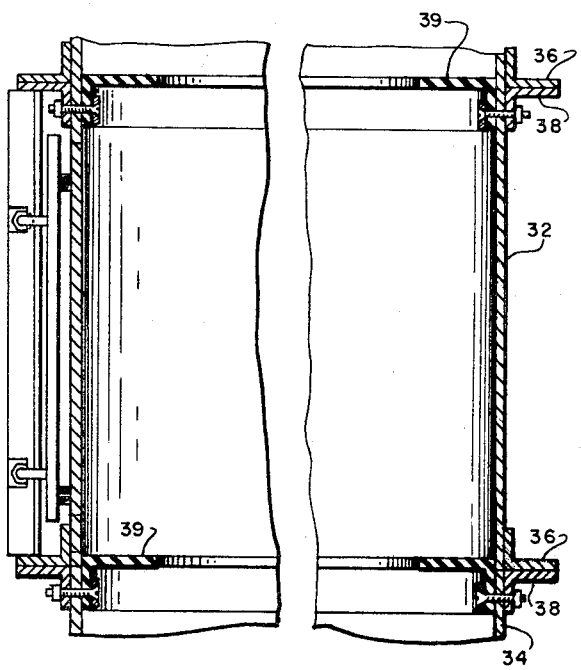
FIG. 2      FIG. 4
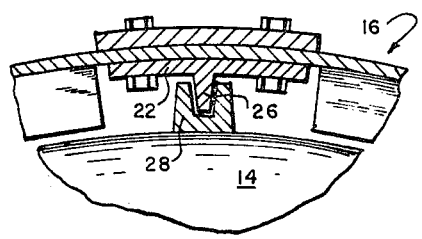
FIG. 5
JAMES F. CHUMLEY
GUY D. PERRY
INVENTORS
ATTORNEYS

United States Patent Office 3,408,870
Patented Nov. 5, 1968

3,408,870
ZERO GRAVITY APPARATUS
James F. Chumley, Decatur, and Guy D. Perry, Huntsville, Ala., assignors to the United States of America as represented by the Administrator of the National Aeronautics and Space Administration
Filed May 9, 1966, Ser. No. 548,808
9 Claims. (Cl. 73—432)

ABSTRACT OF THE DISCLOSURE

The invention is a zero gravity device that includes a drop tower and a vertical deceleration tube having a pair of guide rails extending the length thereof. A capsule is slidably mounted on the guide rails and the capsule is dropped from the top of the drop tower into the deceleration tube and its acceleration is controlled during descent so as to provide a short period of zero gravity. A plurality of spaced annular seals are positioned in the deceleration tube. These seals engage the outer periphery of the dropped capsule and result in a pressure buildup within the deceleration tube that decelerates and stops the capsule. A series of vent orifices in the side of the deceleration tube exhausts pressure built up within the tube so as to prevent rebounding of the capsule.

---

The invention described herein was made by employees of the United States Government and may be manufactured and used by or for the Government for governmental purposes without the payment of any royalties thereon or therefor.

This invention relates in general to apparatus for creating an environment of zero gravity for a short period of time. More particularly this invention is a zero gravity apparatus utilizing a new and improved pneumatic decelerating means to decelerate a payload subjected to zero gravity conditions by dropping it from a height.

The advent of the space program has generated a very urgent requirement for methods and techniques to test instruments and other mechanisms intended for use in outer space in a zero gravity environment. A method employed heretofore in achieving zero gravity conditions has been to drop a hollow body or capsule containing the instruments to be tested from a considerable height. By controlling the velocity and acceleration of the capsule during the drop it is possible to nullify the earth's gravitational forces and thus produce a zero gravity condition within the hollow capsule. In order to achieve a zero gravity condition in this manner it is necessary to decelerate and stop the capsule at the terminal portion of the fall without damage to the capsule or instruments contained therein.

The methods, techniques and structural devices employed heretofore in generating an artificial zero gravity condition have generally included dropping a capsule from a height and employing various types of devices for decelerating and stopping the capsule at the end of its fall. The devices employed heretofore have differed from this invention primarily in the manner in which the dropped capsule was decelerated. For example, one method used has been to drop the capsule from a considerable height and catch it in a net equipped with shock absorbers. Yet another method is to equip the capsule being dropped with an elongated, sharp pointed nose portion and then drop the capsule nose first into a bed of wheat, sand and/or other coarse and losely compacted material. While this method of decelerating and stopping the capsule eliminates much of the destructive impact forces the deceleration is very rapid and the instrument payload within the capsule is subjected to severe deceleration forces. As a result this method is not satisfactory when relatively delicate instruments are to be tested. Yet another prior art method of decelerating a dropped capsule is to drop the capsule into a large mass of pellet-size Styrofoam balls. This method is relatively effective in obtaining a comparatively gentle deceleration phase, but has the disadvantage that the Styrofoam balls have to be replaced after each drop at a cost of several thousand dollars. It is likewise necessary in deceleration devices using wheat, sand or other coarse materials to periodically loosen and/or replace the compacted materials.

A zero gravity apparatus constructed in accordance with this invention avoids the disadvantages of prior art devices by utilizing a pneumatic deceleration means which is of relatively simple construction and can be used over and over again without any mechanical repairs or modifications thereto with the exception of certain minor adjustments discussed hereafter. A device constructed in accordance with this invention is capable of decelerating and stopping a four to five thousand pound capsule in fifty feet without subjecting the capsule and payload to a force of over twenty-five G's. This is accomplished when the capsule is dropped from a height of 360 feet and acquires a velocity of 100 plus miles per hour during descent.

The invention includes a pneumatic deceleration tube held in a vertical upright position by a supporting framework or drop tower. A pair of guide rails are mounted in a diametrically opposed position to the inner surface of the deceleration tube and these guide rails extend upwardly to the top of the drop tower and are supported along their length thereby. A capsule is mounted to slide on the guide rails and is guided thereby during its descent and travel through the deceleration tube. A winch is mounted on the drop tower and connected through a cable and pulley arrangement to the capsule so as to provide a means for lifting the capsule to the top of the rails and dropping it. The instruments to be tested are mounted in a suitable manner (not shown) within the capsule along with any instruments needed to monitor the operation of the instruments being tested.

It is believed readily apparent from the foregoing brief description of the invention that the invention has many advantages over the prior art, particularly in the area of initial cost of installation and maintenance requirements.

It is therefore an object of this invention to provide a new and improved pneumatic deceleration device for a zero gravity apparatus.

Another object of this invention is to provide an apparatus capable of simulating zero gravity conditions which can be used extensively without replacement or maintenance operations on major components thereof.

A yet further object of this invention is to provide a zero gravity apparatus in which a capsule is dropped from a height into a deceleration tube and the pressure build-up within the deceleration tube decelerates and stops the capsule.

Additional objects and attendant advantages of this invention will become more apparent when considering the following detailed description in conjunction with the accompanying drawings where:

FIGURE 1 is a view, in elevation, of the zero gravity apparatus.

FIGURE 2 is a cut-away view of a section of the deceleration tube in which orifices are formed.

FIGURE 3 is a view in section taken along lines 3—3 of FIGURE 2.

FIGURE 4 is a view, in section, taken along lines 4—4 of FIGURE 2.

FIGURE 5 is a view, in section, of the manner in which guide rails are attached to the periphery of the deceleration tube.

Referring now to the drawings wherein like numerals in each of the several views are used to indicate like elements. Referring to FIGURE 1 in particular, there is shown a zero gravity apparatus 10 comprising a drop tower 12, a capsule 14 that includes a cylindrical section 15, and a deceleration tube 16. A winch arrangement 18 centrally mounted in the drop tower includes a cable 19 connected to capsule 14 after it passes over a series of pulleys 20. The cable is connected to capsule 14 by a quick release mechanism (not shown). A pair of guide rails 22 and 24 extend the length of the drop tower and these guide rails are mounted to the interior of deceleration tube 16 in a diametrically opposed position, as illustrated in FIGURE 5. The guide rails are T-shaped in cross section and include an inwardly extending portion 26 which extends into guide brackets 28 and 30 mounted on the periphery of capsule 14. The guide rails and guide brackets formed on the capsule function to accurately guide the capsule into the deceleration tube when the capsule is dropped from the top of the drop tower.

It will be noted that there is a relatively loose fit between the outer surface of the guide rails and the interior surfaces of the guide brackets. Due to this loose fit a rush of air is permitted to pass between the guide rails and guide bracket at a considerable velocity as the capsule makes its descent when dropped. This rush of air produces an air bearing effect between the guide rails and guide brackets and this in turn results in very low frictional forces therebetween and eliminates any wobbling or deflection of the capsule with respect to the guide rails during its descent.

The deceleration tube is cylindrical in shape and fabricated from a series of short cylindrical sections 32 and 34 (see FIGURE 4). These short cylindrical sections are joined together to form a stack and annular ring like connecting members 36 and 38 are positioned at each end of the short cylindrical sections. The cylindrical sections are assembled by positioning section 32 on section 34 so that the ring like connecting members abut one another and the two sections are secured at their juncture by some suitable means such as welding or bolting.

A plurality of annular sealing members 39 are mounted in a spaced relation along the length of the deceleration tube. The sealing members are composed of a resilient material such as neoprene rubber and are L-shaped; one leg of the L being attached to the interior surface of the deceleration tube and the other leg extending inwardly into the interior of the cylinder to a position where it will engage cylindrical section 15 of the capsule. The spacing of the sealing members along the deceleration tube is slightly less than the length of cylindrical section 15 of the capsule. Thus, during descent of the capsule through the deceleration tube, one of the sealing members remains in engagement with the cylindrical section of the capsule at all times to assure a substantially air tight seal therebetween and prevent exhausting of the pressure ahead of the capsule back past the capsule. The seal obtained between the annular seals and the outer surface of the capsule is not a zero leakage seal by any means. There is some leakage between the annular seal and the capsule and also there is some leakage in the area of the guide rails since it would be very difficult to provide a good seal in the area of the guide rails. Thus, gaps are left in the seals in the area of the guide rails (see FIG. 5). However, the leakage that does exist is highly repeatable, i.e., the leakage is the same in drop after drop of the capsule and therefore this leakage can be taken into account when designing the exhaust orifices described hereafter. However, it should be noted that even with this leakage there is a substantial buildup of pressure in the tube which stops the downward descent of the capsule. In fact the pressure buildup is sufficient that were it not for the exhaust orifices discussed hereafter there would be substantial rebound of the capsule in the tube.

A desired number of the cylindrical sections making up the deceleration tube have an orifice 40 formed therein, (see FIGURE 2) through which air is exhausted upon entry of the capsule into the deceleration tube. The effective size of the orifices and thus the amount of air which can be exhausted therefrom is controlled by means of an adjustable cover mechanism which can be adjusted to cover only a desired portion of orifice 40.

The adjustable cover mechanisms consist of a U-shaped channel member 44 connected between ring members 38 and 36. A rectangular cover plate 46 is positioned between channel member 44 and the outer surface of cylindrical section 32 so as to cover as much as necessary of orifice 40 formed therein. Cover plate 46 has a pair of L-shaped rods 48 and 50 mounted thereon and these rods extend through openings formed in channel member 44. Ends 52 and 53 (see FIGURE 2) of each of the L-shaped rods are threaded to each receive a pair of adjustable nuts 54 and 56 disposed on each side of channel members 44. Nuts 54 and 56 are loosened for adjustment of cover plate 46 and tightened to hold cover plate 46 in a desired position. A pair of bolts 58 and 60 are threaded into the bottom of U-shaped channel 44 which when tightened down force cover plate 46 against the cylindrical section 32 in a rigid position when the cover plate has been adjusted to open or uncover a desired portion of orifice 40.

The operation of the zero gravity apparatus is as follows, assuming that the capsule 14 has been raised to the top of the drop tower. The quick release mechanism built into the capsule (not shown) is actuated and the capsule is freed from the restraint of the cable holding it up. The capsule then falls down the guide rails. The velocity of the capsule during its fall is controlled by some type of suitable thruster devices (not shown), such as a pulse rocket, built into the capsule. The thruster devices would be controlled by means of an accelerometer type device (not shown) which senses the velocity of the capsule during its fall. By controlling the velocity of the capsule during its fall the gravitational forces of the earth are exactly overcome and any payload contained within the capsule is subjected to a zero gravity environment. The forward portion of the capsule is rounded and as the capsule enters the deceleration tube, this portion of the capsule engages the inwardly extending portions of the flexible seals to form a substantially air tight seal around the capsule. The elongated cylindrical portion of the capsule remains in contact with the first seal engaged until the forward portion of the capsule engages the next in line seal positioned within the deceleration tube which again forms a substantially air tight seal. This sequence of events continues as the capsule progresses down through the tube and, as is readily apparent, the pressure within the tube will substantially increase. A certain amount of the pressure within the deceleration tube will be vented to the outside through orifices 40 in order to prevent an excessive pressure build-up within the tube which would cause the payload within the capsule to be stopped too quickly and result in excessive G forces being applied to the payload. Excessive pressure build-up would also cause the capsule to rebound upwardly within the deceleration tube. The size of orifice required in the deceleration tube will vary considerably depending upon the weight of the capsule being dropped and the height from which the capsule is dropped. The size of the orifice needed can be calculated to obtain a complete stop without any rebound and without subjecting the capsule payload to a gravitational force of more than 25 G's. Thus, prior to use of the zero G apparatus for the initial test of a payload of a particular weight, it is necessary to calculate the size orifice needed and then adjust the cover plate 42 covering orifices 40 to provide the desired opening.

This completes the detailed description of the invention. While a preferred exemplary embodiment thereof has been described herein it will be apparent to those skilled in the art to which this invention pertains that many changes and modifications may be made thereto without departing from the spirit or scope of the invention as defined in the claims appended hereto. For example, an apparatus constructed in accordance with the principles of this invention could be adapted to provide an escape mechanism whereby a number of people would be loaded into an appropriately constructed capsule and be rapidly evacuated from the upper stories of tall buildings.

What is claimed is:

1. An apparatus comprising:
   a capsule adapted to carry a load;
   a drop tower including means mounted thereon and releasably connected to said capsule for raising said capsule to a predetermined height along said drop tower and dropping it;
   pneumatic cylinder means positioned at the base of said drop tower for receiving said capsule when dropped from said tower and decelerating said capsule to a complete stop without damage to the load carried therein;
   guide means connected to said drop tower and to said pneumatic cylinder means for guiding said capsule during its descent from said drop tower into said pneumatic cylinder means;
   said pneumatic cylinder means including a cylindrical body and a series of spaced sealing means attached to the interior and along the length thereof for engaging the capsule in a sealing relationship as it travels through said cylinder means: whereby, the air present in said cylinder means is compressed to raise the pressure therein to a level which will stop the capsule within said cylinder means.

2. The apparatus recited in claim 1 wherein said pneumatic cylinder means includes a means for controlling the air pressure within said cylindrical body so as to prevent rebound of the capsule therein.

3. The apparatus recited in claim 2 wherein each of said series of sealing means comprises:
   (a) an annular seal having a first portion attached to said cylindrical body and a second flexible portion extending inwardly toward the center of said cylindrical body.

4. The apparatus recited in claim 3 wherein said means for controlling the air pressure within said cylindrical body comprises:
   (a) a plurality of exhaust openings formed along the length of said cylindrical body, and
   (b) adjustable means mounted on said cylindrical body for altering the effective size of said vent opening and thereby controlling the pressure build-up within said cylindrical body.

5. An apparatus for providing a zero gravity environment comprising:
   a capsule adapted to carry a payload therein;
   a drop tower having a hoist means mounted thereon that is adapted to be connected to said capsule for raising it to a predetermined height along said drop tower and dropping it;
   a deceleration tube positioned at the base of said drop tower for receiving said capsule when dropped from said tower and decelerating said capsule to a complete stop without damage to the load carried therein;
   a series of flexible annular sealing members mounted in a spaced relation along the length of said deceleration tube for engaging the capsule as it travels through said deceleration tube so as to cause a pressure build-up within said deceleration tube to decelerate the capsule;
   a pair of guide rails attached at their lower end to the interior of said deceleration tube and at their upper end to said drop tower, said guide rails being attached in a diametrically opposed position in said deceleration tube; and
   bracket means mounted on said capsule and in engagement with said pair of guide rails for guiding said capsule during its fall and entry into said deceleration tube.

6. The apparatus recited in claim 5 wherein the flexible annular sealing members mounted in the deceleration tube are L-shaped having one length thereof attached to said deceleration tube and the other length thereof extending inwardly towards the center of said deceleration tube so as to engage said capsule and cause the pressure buildup within said deceleration tube that stops the capsule.

7. The apparatus recited in claim 6 wherein said annular sealing members are composed of neoprene rubber.

8. The apparatus recited in claim 6 wherein said deceleration tube is composed of a plurality of cylindrical sections attached together to form a tube.

9. The apparatus recited in claim 8 wherein:
   (a) a predetermined number of said cylindrical sections have exhaust openings formed therein, and
   (b) said cylindrical sections having the openings formed therein include an adjustable cover mechanism for covering a desired portion of the opening and thus varying the effective size of said exhaust openings to control the pressure build-up within said deceleration tube.

References Cited

UNITED STATES PATENTS

| | | | |
|---|---|---|---|
| 2,656,711 | 10/1953 | Tschudi | 73—12 |
| 3,014,360 | 12/1961 | Herrmann | 73—12 |
| 3,062,036 | 11/1962 | York | 73—12 |

S. CLEMENT SWISHER, *Acting Primary Examiner.*

NEIL B. SIEGEL, *Assistant Examiner.*